US011017492B2

(12) United States Patent
Nakata et al.

(10) Patent No.: US 11,017,492 B2
(45) Date of Patent: May 25, 2021

(54) VIDEO SIGNAL SWITCHING FOR USE WITH AN EXTERNAL GRAPHICS PROCESSING UNIT DEVICE

(71) Applicant: LENOVO (Singapore) PTE. LTD., New Tech Park (SG)

(72) Inventors: Munefumi Nakata, Yokohama (JP); Yasumichi Tsukamoto, Yokohama (JP); Seiji Yamasaki, Yokohama (JP); Yasushi Tsukamoto, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 32 days.

(21) Appl. No.: 16/441,296

(22) Filed: Jun. 14, 2019

(65) Prior Publication Data

US 2019/0392548 A1    Dec. 26, 2019

(30) Foreign Application Priority Data

Jun. 21, 2018  (JP) .............................. JP2018-118311

(51) Int. Cl.
  *G06T 1/20* (2006.01)
  *G06F 13/42* (2006.01)
  *G06F 13/20* (2006.01)

(52) U.S. Cl.
  CPC ............... *G06T 1/20* (2013.01); *G06F 13/20* (2013.01); *G06F 13/4282* (2013.01); *G06F 2213/0042* (2013.01)

(58) Field of Classification Search
  None
  See application file for complete search history.

(56) References Cited

U.S. PATENT DOCUMENTS

| 2009/0037633 | A1* | 2/2009 | Solomon | ............... | G06F 1/1632 710/303 |
| 2010/0315437 | A1 | 12/2010 | Sinclar, II et al. | | |
| 2012/0236755 | A1* | 9/2012 | Chorney | ............... | H04J 3/0658 370/253 |
| 2014/0152674 | A1* | 6/2014 | Koo | ...................... | G06F 1/1632 345/502 |

(Continued)

FOREIGN PATENT DOCUMENTS

| JP | 2000175071 A | 6/2000 |
| JP | 2003316347 A | 11/2003 |

(Continued)

*Primary Examiner* — Jason A Pringle-Parker
(74) *Attorney, Agent, or Firm* — Kunzler Bean & Adamson (57) ABSTRACT

An apparatus for video signal switching for use with an external graphics processing unit device includes an input unit of an information processing device configured to input a first video signal from an external device comprising a graphics processing unit ("GPU") and an input/output interface, a processing unit of the information processing device configured to output a second video signal, and a switching unit configured to determine a route for a video display signal that is output to a display unit, the route selected from an external route along which the first video signal is output to the display unit without going through the processing unit and an internal route along which the second video signal is output to the display unit. A computer program product and a system perform the functions of the apparatus.

20 Claims, 5 Drawing Sheets

(56) References Cited

U.S. PATENT DOCUMENTS

| | | | | |
|---|---|---|---|---|
| 2016/0117793 A1* | 4/2016 | Sierra | ........................ | G06T 1/20 345/502 |
| 2016/0335222 A1* | 11/2016 | Schnell | ............... | G06F 13/4286 |
| 2017/0060209 A1* | 3/2017 | Volek | ........................ | H02J 7/00 |

FOREIGN PATENT DOCUMENTS

| | | | |
|---|---|---|---|
| JP | 2007164071 | A | 6/2007 |
| JP | 2007179225 | A | 7/2007 |
| JP | 2008009253 | A | 1/2008 |
| JP | 2008040190 | A | 2/2008 |
| JP | 2009539192 | A | 11/2009 |
| JP | 2010020596 | A | 1/2010 |
| JP | 2011014155 | A | 1/2011 |
| JP | 2012514441 | A | 6/2012 |
| JP | 2012141898 | A | 7/2012 |
| JP | 2012256223 | A | 12/2012 |
| JP | 2015505395 | A | 2/2015 |
| JP | 2015068961 | A | 4/2015 |
| JP | 2017058431 | A | 3/2017 |
| WO | 2010078448 | A2 | 7/2010 |

\* cited by examiner

VIDEO SIGNAL SWITCHING FOR USE WITH AN EXTERNAL GRAPHICS PROCESSING UNIT DEVICE

FIELD

The subject matter disclosed herein relates to information processing devices and more particularly relates to an apparatus, computer program product and system for video signal switching for use with an external graphics processing unit device.

BACKGROUND

Various personal computers ("PCs") include a built-in graphics processing unit ("GPU"). For certain applications, in order to connect a PC with an internal GPU (e.g., a built-in or an integrated GPU) to a high-resolution external monitor, an external GPU device is used. Some display controllers for PC's include a video mode switch configured to switch high performance graphics processing between the built-in GPU and the external GPU depending on whether the internal GPU or the external GPU device is less loaded. In existing systems, image quality deterioration occurs as data is transferred among devices when using an external GPU device to process data for displaying a video on a built-in display.

SUMMARY

An apparatus video signal switching for use with an external graphics processing unit device is disclosed. In one embodiment, the apparatus includes an input unit of an information processing device configured to input a first video signal from an external device comprising a graphics processing unit ("GPU") and an input/output interface, a processing unit of the information processing device configured to output a second video signal, and a switching unit configured to determine a route for a video display signal that is output to a display unit, the route selected from an external route along which the first video signal is output to the display unit without going through the processing unit and an internal route along which the second video signal is output to the display unit.

In various embodiments, the apparatus further includes an output unit configured to output video data which is output from the processing unit to the external device, the output unit being an independent interface from the input unit, where the input unit inputs a video signal which is obtained by performing predetermined processing on the video data by the external device as the first video signal. In some embodiments, the input unit inputs the video signal which is obtained by communicating performance information of the display unit to the external device and performing the predetermined processing on the video data based on the performance information of the display unit by the external device as the first video signal.

In certain embodiments, the switching unit includes a first switch to which the first video signal which is input through the input unit is supplies, a second switch to which the first video signal which is output from the first switch and the second video signal which is output from the processing unit is supplied, and a switching control section which controls the second switch, where the first video signal is supplied from the first switch to the second switch by the switching control section, the second switch outputs the first video signal to the display unit and where the first video signal is not supplied from the first switch to the second switch by the switching control section, the second switch outputs the second video signal to the display unit.

In various embodiments the apparatus further includes a third switch that supplies the first video signal to the switching unit, wherein the third switch includes a passive crossbar switch and the first switch and second switch of switching unit includes passive switches. In some embodiments, the apparatus further includes a controller configured to set a video input/output interface of the information processing device comprising the input unit to operate in a video sink mode to receive the first video signal from an output unit of the external device, the output unit comprising a video input/output interface configured to operate in a video source mode. In certain embodiments, the processing unit is a Central Processing Unit ("CPU") having a video data processing function. In various embodiments, the input unit is an interface which conforms to the USB Type-C standard. In some embodiments, the display unit is a built-in display unit of the information processing device.

A computer program product for video signal switching for use with an external graphics processing unit device is disclosed. In one embodiment, the computer program product includes a processor of an information processing device; and a tangible memory comprising code executable by the processor, the code configured to cause the processor to: input a first video signal from an external device; output a second video signal to a display unit; and determine a route for a video display signal that is output to a display unit, the route selected from an external route along which the first video signal is output to the display unit without going through the processing unit and an internal route along which the second video signal is output to the display unit.

In various embodiments, the code is further configured to cause the processor to: output video data which is output from the processing unit to the external device, via an output unit of information processing device that is an independent interface from an input unit of the information processing device, where the input unit inputs a video signal which is obtained by performing predetermined processing on the video data by the external device as the first video signal. In some embodiments, the code is further configured to cause the processor to communicate performance information of the display unit to the external device, and to cause the input unit to input the video signal which is obtained by performing the predetermined processing on the video data based on the performance information of the display unit by the external device as the first video signal.

In some embodiments, the code is further configured to: control a first switch to which the first video signal which is input through the input unit is supplied; control a second switch to which the first video signal output from the first switch and the second video signal output from the processing unit are supplied; cause the second switch to output the first video signal to the display unit in response to the first video signal being supplied from the first switch; and cause the second switch to output the first video signal to the display unit in response to the first video signal not being supplied from the first switch. In certain embodiments, the code is further configured to control a third switch that supplies the first video signal to the switching unit, wherein the third switch comprises a passive crossbar switch and the first switch and second switch of switching unit comprise passive switches.

In various embodiments, the code is further configured to set a video input/output interface of the information processing device comprising the input unit to operate in a video sink mode to receive the first video signal from an output unit of the external device, the output unit comprising a video input/output interface configured to operate in a video source mode. In some embodiments, the processing unit is a Central Processing Unit ("CPU") having a video data processing function. In various embodiments, the code is further configured to send video data that is configured to be communicated over an interface which conforms to the USB Type-C standard. In some embodiments, the display unit is a built-in display unit of the information processing device.

A system for video signal switching for use with an external graphics processing unit device is disclosed. In one embodiment, the system includes an external device which at least includes a GPU (Graphics Processing Unit) and an input/output interface; and a video display device which at least includes a display unit, an input unit configured to input a first video signal from the external device, a processing unit configured to output a second video signal, an output unit configured to output video data which is output from the processing unit to the external device, and a switching unit configured to determine a route for a video display signal that is output to a display unit, the route selected from an external route along which the first video signal is output to the display unit without going through the processing unit and an internal route along which the second video signal is output to the display unit. In certain embodiments, the input/output interface in the external device and the input unit and the output unit in the video display device are interfaces which conform to the USB Type-C standard.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Referring to the following drawings, preferred embodiments of the present invention will be described. In the respective drawings, members assigned with the same reference numerals have the same or similar structures.

In the embodiments below, "a meeting" will be described as one example of "an event" in which an information processing device is used. This, however, is not an exclusive example, and any other events or occasions are applicable without limitation. Further, in the embodiments below, "a display device" is described as one example of "an external device". This, however, is not an exclusive example, and "an external device" includes any other output devices, for example, a projector or a speaker, that output at least one of images and sounds.

Figure 1:
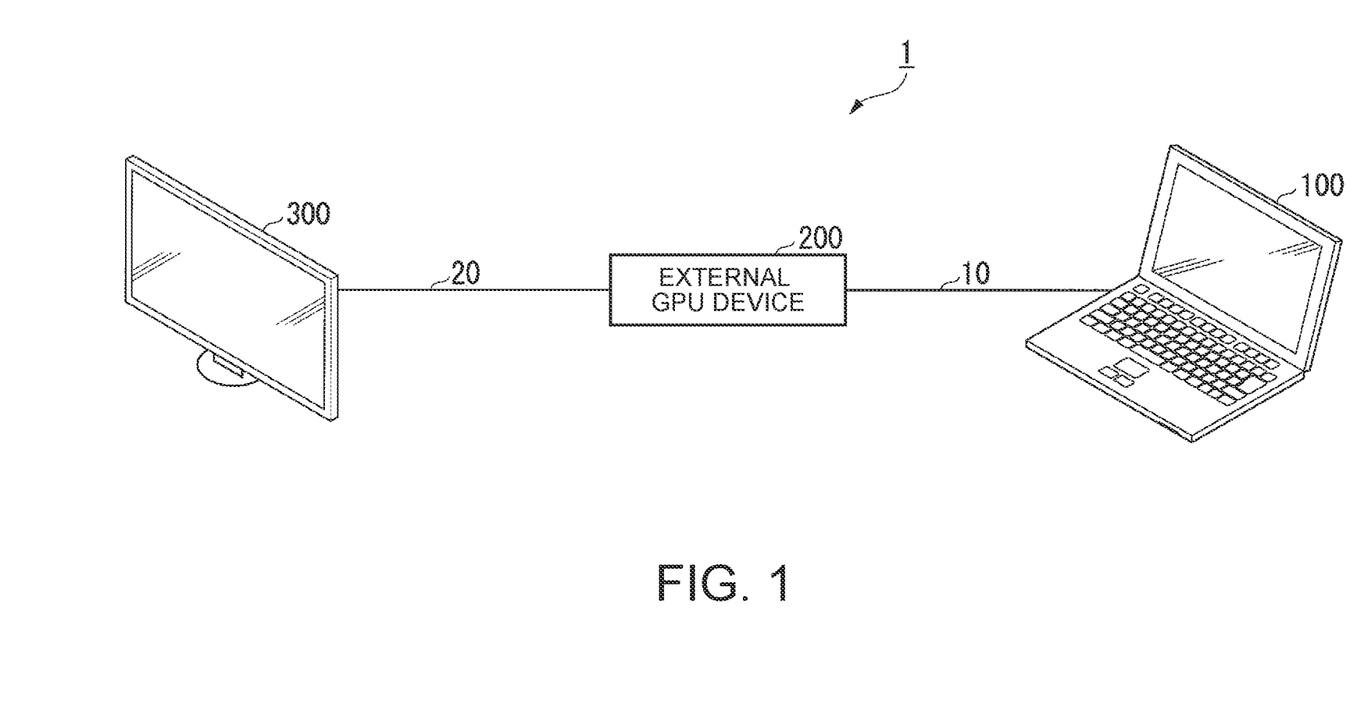
FIG. 1 is a schematic block diagram illustrating one embodiment of a system for video signal switching for use with an external graphics processing unit device.

FIG. 1 is a schematic block diagram illustrating one embodiment of a system 1 (e.g., a video display system or an information processing system with a video display) for video signal switching for use with an external graphics processing unit device. In one embodiment, the system 1 includes, for example, an apparatus 100 (e.g., for an information processing device such as a personal computer) and an external GPU (Graphics Processing Unit) device 200. In addition, the system 1 is equipped with an external display panel 300. The apparatus 100 and the external GPU device 200 are connected with each other via a first connection cable 10 so as to make data communication therebetween possible. The external GPU device 200 and the external display panel 300 are connected with each other via a second connection cable 20 so as to make data communication therebetween possible. The system 1 operates to output video data from the apparatus 100 (e.g., the personal computer) to the external GPU device 200. The video data is data which is in a state before drawing processing (e.g., video/graphics processing) is performed thereon.

In certain embodiments, where the video data which is output from the apparatus 100 (e.g., the personal computer) is input into the external GPU device 200, the external GPU device 200 performs the drawing processing (e.g., video/graphics processing) on the video data concerned. Thereby, the external GPU device 200 generates a video signal which serves as a signal which is supplied to a built-in display panel of the apparatus 100 (e.g., personal computer) and thereby makes it possible to display a video on the built-in display panel. The external GPU device 200 outputs the video signal on which the drawing processing (e.g., video/graphics processing) is performed to the apparatus 100. In some embodiments, where the video signal is supplied to the apparatus 100 (e.g., personal computer), the apparatus 100 outputs the video signal to the built-in display panel and thereby displays the video on the built-in display panel.

In various embodiments, the external GPU device 200 also makes it possible to display the video on the external display panel 300 by outputting the video signal to the external display panel 300. The video display system 1 illustrated in FIG. 1 is equipped with the external display panel 300. However, In certain embodiments, where the external GPU device 200 is connected to the apparatus 100, the video display system 1 may not be equipped with the external display panel 300, not limited to the configuration illustrated in FIG. 1.

Figure 2:
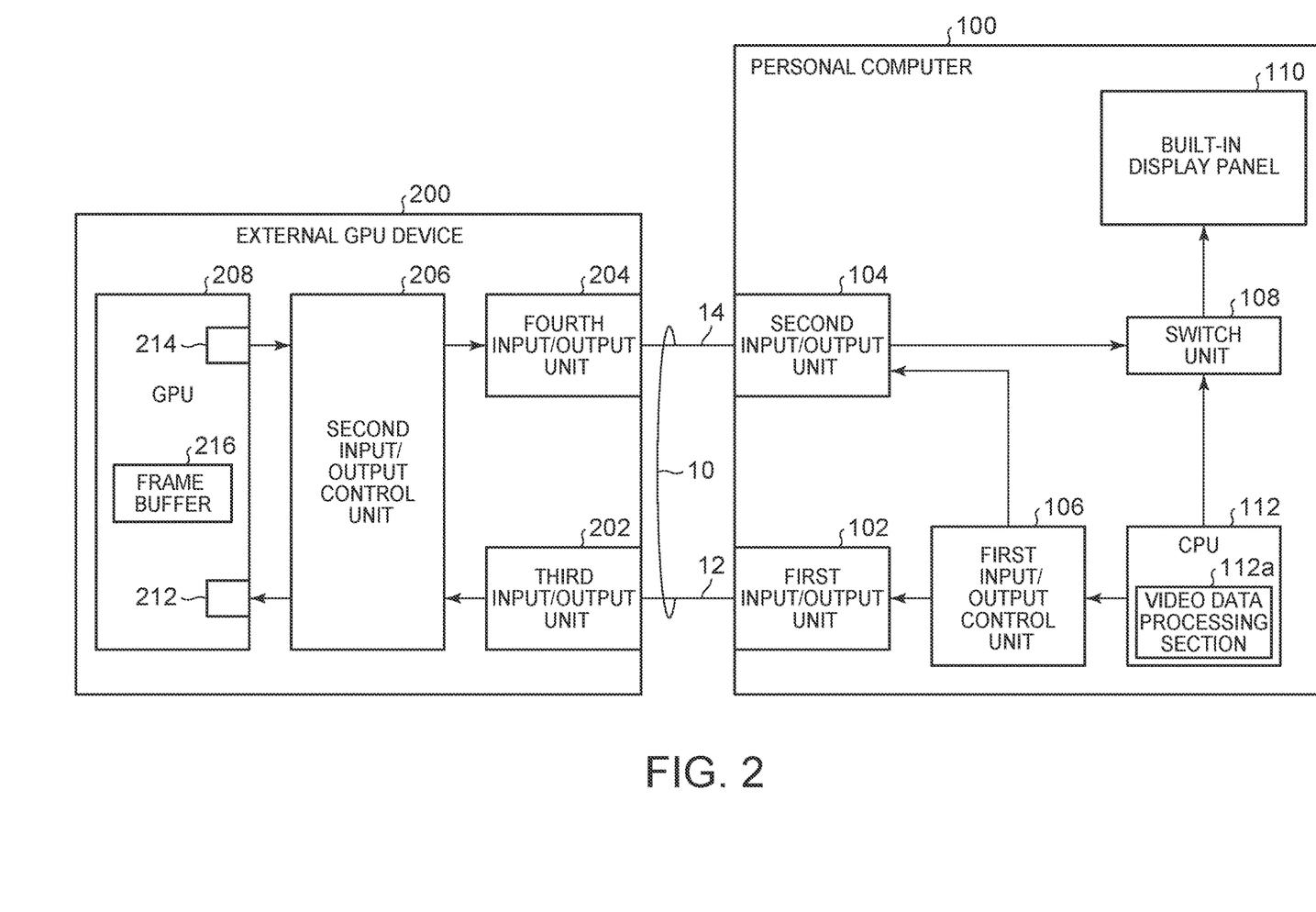
FIG. 2 is schematic block diagram illustrating one embodiment of an apparatus for video signal switching for use with an external graphics processing unit device.

FIG. 2 is schematic block diagram illustrating one embodiment of an apparatus for video signal switching for use with an external graphics processing unit device. In one embodiment, the apparatus is included within an in information processing device 100 (e.g., a personal computer) that is configured to connect to an external GPU device 200. The apparatus 100 (e.g., personal computer) is equipped with, for example, a first input/output unit 102, a second input/output unit 104, a first input/output control unit 106, a switch unit 108, a built-in display panel 110 and a CPU (Central Processing Unit) 112. The apparatus 100 (e.g., personal computer) is one example of a video display device which is defined in the claims. The video display device is not limited to the apparatus 100 (e.g., personal computer) and may be a video display device or a device which is equipped with a built-in display panel such as a tablet, a smartphone and so forth.

The first input/output unit 102 is an interface which is able to input and output data. The first input/output unit 102 outputs the video signal via, for example, a cable 12. The second input/output unit 104 is an interface which is able to input and output data. The second input/output unit 104 inputs, for example, the video signal. The first input/output unit 102 and the second input/output unit 104 are interfaces which conform to, for example, the Thunderbolt (TM) 3 standard. The second input/output unit 104 may be an interface which conforms to the USB (Universal Serial Bus) Type-C standard.

In various embodiments, in the present embodiment, the interface which conforms to the USB Type-C standard is adopted as the second input/output unit 104. Nevertheless, since the second input/output unit 104 functions as an input unit in the present embodiment, an input-only interface which conforms to the DisplayPort standard, the HDMI (TM) (High-Definition Multimedia Interface) standard and so forth may be adopted as the second input/output unit 104. In the above-mentioned embodiment, one interface which conforms to the USB Type-C standard in the apparatus 100 (e.g., personal computer) may be used and thereby it becomes possible to improve use variations of the interface which conforms to the USB Type-C standard. In various embodiments, where the input-only interface is adopted as the second input/output unit 104, the first input/output unit 102 may be the interface which conforms to the USB Type-C standard. Alternatively, an output-only interface which conforms to the DisplayPort standard, the HDMI (TM) standard and so forth may be adopted as the first input/output unit 102.

The first input/output control unit 106 controls operations of the first input/output unit 102 and the second input/output unit 104. The first input/output control unit 106 may be realized in hardware (by a circuitry) such as, for example, an LSI (Large Scale Integration), an ASIC (Application Specific Integrated Circuit), an FPGA (Field-Programmable Gate Array) and so forth, may be also realized by executing a program and may be realized by cooperation between software and hardware.

The switch unit 108 is, for example, a passive-type display switch. The switch unit 108 is one example of a switching unit which is defined in the claims. The switch unit 108 inputs the video signal from the CPU 112 or the second input/output unit 104. The switch unit 108 supplies the input video signal to the built-in display panel 110. In certain embodiments, where the video signals are input into the switch unit 108 from both of the CPU 112 and the second input/output unit 104, the switch unit 108 outputs either one of the video signals to the built-in display panel 110.

The built-in display panel 110 displays the video in accordance with the video signal which is supplied from the switch unit 108.

The CPU 112 performs various arithmetic operations and various control operations in accordance with a program. The CPU 112 is equipped with, for example, a drawing processing (e.g., video/graphics processing) section 112*a*. The drawing processing (e.g., video/graphics processing) section 112*a* is one of functions which are realized by execution of the program by the CPU 112. The drawing processing (e.g., video/graphics processing) section 112*a* generates the video signal by performing the drawing processing (e.g., video/graphics processing) on the video data. The CPU 112 outputs the video signal to the switch unit 108.

In certain embodiments, the external GPU device 200 is configured to perform the drawing processing (e.g., video/graphics processing) on the video data, and the CPU 112 outputs the video data to the first input/output control unit 106.

The external GPU device 200 is equipped with, for example, a third input/output unit 202, a fourth input/output unit 204, a second input/output control unit 206 and a GPU 208.

The third input/output unit 202 is an interface which is able to input and output data. The third input/output unit 202 inputs, for example, the video data. The fourth input/output unit 204 is an interface which is able to input and output data. The fourth input/output unit 204 outputs, for example, the video signal. The third input/output unit 202 and the fourth input/output unit 204 are interfaces which conform to, for example, the Thunderbolt (TM) 3 standard. The fourth input/output unit 204 may be an interface which conforms to the USB type-C standard.

In various embodiments, an interface which conforms to the USB Type-C standard is adopted as the fourth input/output unit 204. Nevertheless, since the fourth input/output unit 204 functions as an output unit in the present embodiment, an output-only interface which conforms to a standard such as the DisplayPort standard, the HDMI (TM) (High-Definition Multimedia Interface) standard, and so forth, may be also adopted as the fourth input/output unit 204. In various embodiments, In certain embodiments, where the output-only interface is adopted as the fourth input/output unit 204, the third input/output unit 202 may be an interface which conforms to the USB Type-C standard. Alternatively, the input-only interface which conforms to the DisplayPort standard, the HDMI (TM) standard and so forth may be adopted as the third input/output unit 202.

The second input/output control unit 206 controls operations of the third input/output unit 202 and the fourth input/output unit 204. The second input/output control unit 206 may be realized in hardware (by the circuitry) such as, for example, the LSI, the ASIC, the FPGA and so forth, may be also realized by executing a program and may be realized by cooperation between software and hardware. In some embodiments, where the video data is supplied from the third input/output unit 202 to the second input/output control unit 206, the second input/output control unit 206 outputs the video data concerned to the GPU 208. In certain embodiments, where the video signal is supplied from the GPU 208 to the second input/output control unit 206, the second input/output control unit 206 outputs the video signal concerned to the fourth input/output unit 204.

The GPU 208 is an arithmetic operation device (a processor) which specializes in the drawing processing (e.g., video/graphics processing). The GPU 208 is equipped with, for example, an input port 212, an output port 214 and a frame buffer 216. The input port 212 is, for example, an I/O serial interface through which inputting of the video data is possible. The input port 212 may be an interface which conforms to, for example, the PCI (Peripheral Component Interconnect)-Express standard. The output port 214 is an interface through which outputting of the video signal is possible. The output port 214 may be an interface which conforms to, for example, the DisplayPort standard. The output port 214 functions as a display port. The frame buffer 216 is a buffer which stores data in units of frames. The frame buffer 216 temporarily stores the video data which is input through the input port 212. The video data which is stored in the frame buffer 216 is read in by the GPU 208.

The GPU 208 performs the drawing processing (e.g., video/graphics processing) on the video data. The GPU 208 performs the drawing processing (e.g., video/graphics processing) based on display capability information of the built-in display panel 110. The display capability information of the built-in display panel 110 is information which relates to the image quality that the built-in display panel 110 is able to display. The information which relates to toe image quality is, for example, a refresh rate, a resolution and so forth. The GPU 208 performs the drawing processing (e.g., video/graphics processing) according to the display capability of the built-in display panel 110. Thereby, the GPU 208 generates a video signal which makes display of a video which is higher in quality than a video which is displayed in accordance with a video signal which is output from a drawing processing (e.g., video/graphics processing) section 112a possible.

Figure 3:
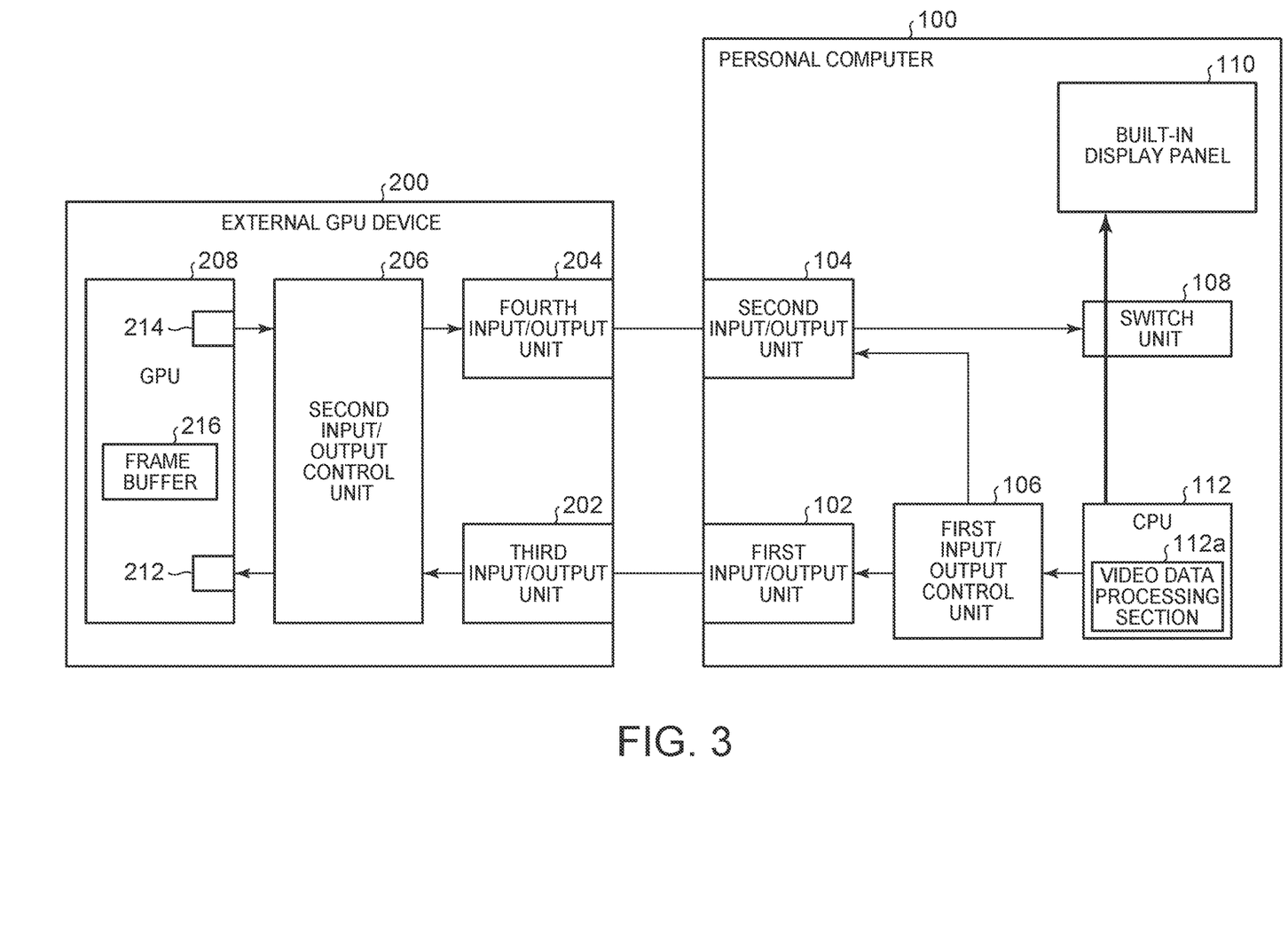
FIG. 3 is schematic block diagram illustrating one example of video signal switching for an external route that processes video data from an information processing device using an external graphics processing unit device.

FIG. 3 is schematic block diagram illustrating one example of video signal switching for an external route that processes video data from an information processing device using an external graphics processing unit device. In certain embodiments, where a video is to be displayed in accordance with the video signal VS1 which is output from the CPU 112, the drawing processing (e.g., video/graphics processing) section 112a generates the video signal VS1 by performing predetermined drawing processing (e.g., video/graphics processing) on the video data. In some embodiments, where a video is to be displayed in accordance with the video signal VS1 which is output from the CPU 112, the switch unit 108 is set to an operation mode of outputting the video signal VS1 which is supplied from the CPU 112 to the built-in display panel 110. The CPU 112 outputs the video signal VS1 which is generated by the drawing processing (e.g., video/graphics processing) section 112a to the switch unit 108 and thereby makes the switch unit 108 output the video signal VS1 to the built-in display panel 110. Thereby, the built-in display panel 110 displays the video thereon in accordance with the video signal VS1 which is generated by the drawing processing (e.g., video/graphics processing) section 112a.

Figure 4:
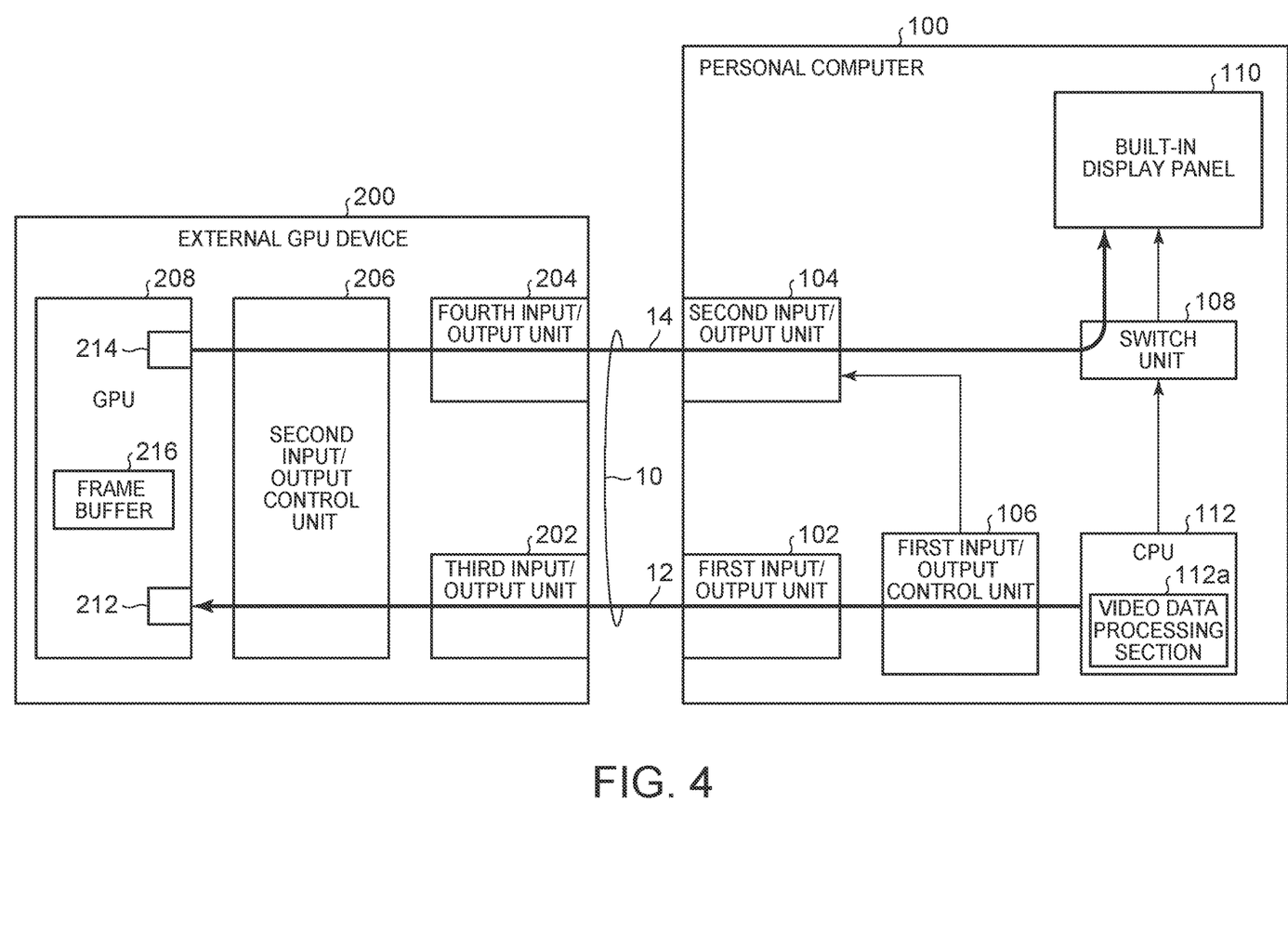
FIG. 4 is schematic block diagram illustrating one example of video signal switching for an internal route that processes video data using an internal graphics processing unit of an information processing device.

FIG. 4 is schematic block diagram illustrating one example of video signal switching for an internal route that processes video data using an internal graphics processing unit of an information processing device. In one embodiment, a video signal VS2 is supplied from the external GPU device 200 to the built-in display panel 110 in one embodiment. In certain embodiments, where a video is to be displayed on the built-in display panel 110 in accordance with the video signal VS2 which is output from the external GPU device 200, the apparatus 100 (e.g., personal computer) and the external GPU device 200 are connected with each other via the first connection cable 10.

In some embodiments, where the apparatus 100 (e.g., personal computer) and the external GPU device 200 are connected with each other via the first connection cable 10, the first input/output control unit 106 sets operation modes of the first input/output unit 102 and the second input/output unit 104 and the second input/output control unit 206 sets operation modes of the third input/output unit 202 and the fourth input/output unit 204.

The first input/output control unit 106 sets the operation mode of the first input/output unit 102 to one Thunderbolt (TM) 3 mode. This Thunderbolt (TM) 3 mode is the operation mode in which it is possible to output the video data by performing an operation which conforms to the Thunderbolt (TM) 3 standard. The first input/output control unit 106 sets the operation mode of the second input/output unit 104 to a DisplayPort sink ("SNK") mode. This DisplayPort SNK mode is the operation mode in which it is possible to input the video signal VS2 in synchronization with the fourth input/output unit 204 by performing an operation which conforms to the DisplayPort standard as the sink. The second input/output control unit 206 sets the operation mode of the third input/output unit 202 to another Thunderbolt (TM) 3 mode. This Thunderbolt (TM) 3 mode is the operation mode in which it is possible to input the video data by performing an operation which conforms to the Thunderbolt (TM) 3 standard. The second input/output control unit 206 sets the operation mode of the fourth input/output unit 204 to a DisplayPort source ("SRC") mode. The DisplayPort SRC mode is the operation mode in which it is possible to output the video signal VS2 by performing an operation which conforms to the DisplayPort standard as the source. The apparatus 100 (e.g., personal computer) and the external GPU device 200 are connected with each other to be communicable by setting the operation modes of the first input/output unit 102, the second input/output unit 104, the third input/output unit 202 and the fourth input/output unit 204 in this way. In various embodiments, in regard to insertion timings of two cables 12 and 14 which connect together the apparatus 100 (e.g., personal computer) and the external GPU device 200, the two cables 12 and 14 may be inserted also in predetermined order so as to make transmission and reception directions of data and signals appropriate.

The CPU 112 supplies video data to the external GPU device 200 via the first input/output control unit 106, the first input/output unit 102 and the cable 12 in a state where the apparatus 100 (e.g., personal computer) and the external GPU device 200 are connected with each other to be communicable. The external GPU device 200 supplies the video data to the GPU 208 via the third input/output unit 202 and the second input/output control unit 206. The GPU 208 generates the video signal VS2 by performing the predetermined drawing processing (e.g., video/graphics processing) and outputs the generated video signal VS2. The GPU 208 supplies the video signal VS2 to the apparatus 100 (e.g., personal computer) via the second input/output control unit 206, the fourth input/output unit 204 and the cable 14.

The video signal VS2 which is supplied from the external GPU device 200 via the cable 14 is input into the apparatus 100 (e.g., personal computer) through the second input/output unit 104. The second input/output unit 104 outputs the input video signal VS2 to the switch unit 108. In certain embodiments, where a video is to be displayed in accordance with the video signal VS2 which is input from the external GPU device 200, the switch unit 108 is set to an operation mode in which the video signal VS2 which is supplied from the second input/output unit 104 is output to the built-in display panel 110. The switch unit 108 outputs the input video signal VS2 to the built-in display panel 110. Thereby, the built-in display panel 110 displays the video thereon in accordance with the video signal VS2 which is generated by the external GPU device 200.

As described above, the apparatus 100 (e.g., personal computer) is equipped with the second input/output unit 104 which inputs the video signal VS2 from the external GPU device 200 which is installed as an external video output device, the CPU 112 which outputs the video signal VS1 to the built-in display panel 110 and the switch unit 108 which makes the switch of the route along which the video signal is output to the built-in display panel 110 between the route along which the video signal VS2 is output to the built-in display panel 110 without going through the CPU 112 and the route along which the video signal VS1 is output to the built-in display panel 110. In one embodiment of the apparatus 100, it becomes possible to display the video on the built-in display panel 110 without deteriorating the video signal which is processed by the external GPU device 200. That is, according to one embodiment of the apparatus 100, it becomes possible to improve the performance of the drawing processing (e.g., video/graphics processing) by the external video output device (the external GPU device 200).

For example, in general, In certain embodiments, where a video signal which is supplied from an external GPU device to a personal computer is supplied to a switch unit via an input/output control unit, it is necessary to perform protocol conversion processing in the input/output control unit and therefore deterioration of the video signal occurs. In addition, also in some embodiments, where the video signal which is supplied from the external GPU device to the personal computer is supplied to the switch unit via a CPU, it is also necessary to perform the protocol conversion processing in the CPU similarly and therefore deterioration of the video signal occurs. The protocol conversion processing is processing such as, for example, deciphering of a packet, extraction of a signal from the packet, outputting of the extracted signal and so forth. On the other hand, according to one embodiment of the apparatus 100, it is possible to supply the video signal VS2 to the built-in display panel 110 without going through the first input/output control unit 106 and the CPU 112 and therefore it is possible to suppress deterioration of the video signal.

Further, according to one embodiment of the apparatus 100(e.g., personal computer), it is possible to perform the drawing processing (e.g., video/graphics processing) in the external GPU device 200 in conformity to the performance of the built-in display panel 110. Thereby, for example, In certain embodiments, where the refresh rate of the built-in display panel 110 corresponds to a first value and the CPU 112 is allowed to perform only the drawing processing (e.g., video/graphics processing) which corresponds to a second value which is lower than the first value, the external GPU device 200 performs the drawing processing (e.g., video/graphics processing) in conforming to the refresh rate which corresponds to the first value and thereby it becomes possible to display a video of higher quality.

Further, according to the apparatus 100 (e.g., personal computer), in certain embodiments, where a video is to be displayed on the built-in display panel 110 in accordance with the video signal VS2, it is not necessary to perform the drawing processing (e.g., video/graphics processing) and video signal transfer in the CPU 112. Thereby, in some embodiments of the apparatus 100 (e.g., personal computer), it is possible to reduce a processing load on the CPU 112 and therefore it is possible to expect the effect of suppressing heat generation from the CPU 112 and the effect of improving the performance of the CPU 112. Further, it is possible to allocate the processing load which would be imposed on the CPU 112 for execution of the drawing processing (e.g., video/graphics processing) to other processing.

(Modified Example)

Figure 5:
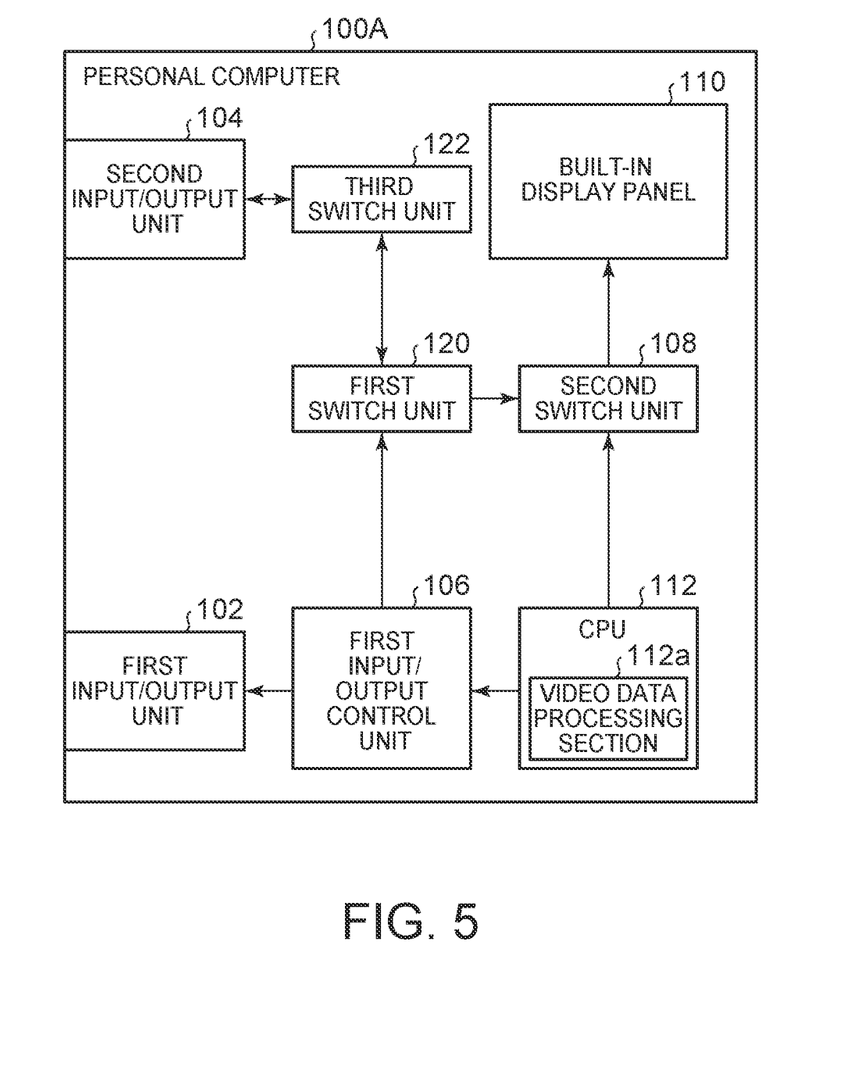
FIG. 5 is schematic block diagram illustrating another embodiment of an apparatus for video signal switching for use with an external graphics processing unit device.

FIG. 5 is schematic block diagram illustrating another embodiment of an apparatus 100A for video signal switching for use with an external graphics processing unit device. In one embodiment, the apparatus 100A is implemented in a personal computer that is different from the apparatus 100 (e.g., personal computer) in the point that the apparatus 100A (e.g., a personal computer) is equipped with a first switch unit 108 which has the same function as that of the above-mentioned switch unit 108, a second switch unit 120 and a third switch unit 122. The third switch unit 122 is, for example, a passive crossbar switch. The first switch unit 108 and the second switch unit 120 are, for example, passive DisplayPort (DP) switches.

In certain embodiments, where the video signal VS2 is supplied from the second input/output unit 104 to the third switch unit 122, the third switch unit 122 outputs the video signal VS2 to the second switch unit 120. It is possible to supply the video signal VS2 which is input through the second input/output unit 104 to the second switch unit 120 and it is also possible to supply the video signal VS2 which is output from the second switch unit 120 and the video signal VS1 which is output from the CPU 112 to the first switch unit 108. The second switch unit 120 outputs the video signal VS2 to the first switch unit 108 in accordance with control of the first input/output control unit 106.

In certain embodiments, where the video signal VS2 is supplied from the second switch unit 120 to the first switch unit 108, the first switch unit 108 outputs the video signal VS2 to the built-in display panel 110 and where the video signal VS2 is not supplied to the first switch unit 108, the first switch unit 108 outputs the video signal VS1 to the built-in display panel 110.

In various embodiments, a program which operates on the apparatus 100 (100A) (e.g., personal computer) and the external GPU device 200 in one aspect of the present disclosure may be a program (a program which operates to make the computer function) which operates to control one or a plurality of processor(s) such as CPU(s) and so forth so as to realize functions which are indicated in the description of the above-mentioned embodiment and modified example which pertain to one aspect of the present invention. Then, information which is handled in the above-mentioned respective devices may be temporarily accumulated in a RAM (Random Access Memory) when processed, then may be stored into various storages such as a flash memory, an HDD (Hard Disk Drive) and so forth and may be read out by the CPU as necessary and correction and writing may be performed on the information.

In various embodiments, some or all elements of each of the apparatus 100A (e.g., personal computer) and the external GPU device 200 in the above-mentioned embodiment and modified example may be realized by a computer which is equipped with one or the plurality of processor(s). In various such embodiments, a program which is adapted to realize a control function of the computer may be recorded in a computer readable recording medium, and the control function may be realized by reading the program which is recorded in this recording medium into the computer system and executing the program.

In various embodiments, here, "the computer system" means computer systems which are built in the apparatus 100A (e.g., personal computer) and the external GPU device 200 and shall include software such as an OS (Operating System) and so forth and hardware such as peripherals and so forth. In addition, "the computer readable recording medium" means portable media such as a flexible disc, a magneto-optical disc, a ROM (Read Only Memory), a CD (Compact Disc)-ROM and so forth and storages such as a hard disc and so forth which are built in the computer system.

Further, "the computer readable recording medium" may also include a medium which dynamically holds a program concerned for a short period of time such as a communication line which is used in certain embodiments, where the program is transmitted over a network such as the Internet and so forth and a communication line such as a telephone line and so forth and a medium which holds the program for a definite period of time such as a volatile memory in a computer system which functions as a server or a client in the above-mentioned embodiments. In addition, the above-mentioned program may be also a program which is adapted to realize some of the aforementioned functions and further may be a program which operates so as to make realization of the aforementioned functions possible in combination with a program which is already recorded in the computer system.

In addition, some or all elements of each of the apparatus 100A (e.g., personal computer) and the external GPU device 200 in the above-mentioned embodiment and modified example may be realized as an LSI which is typically an integrated circuit and may be realized as a chip set. In addition, respective functional blocks of the apparatus 100A (e.g., personal computer) and the external GPU device 200 in the above-mentioned embodiment and modified example may be individually chipped and some or all functional blocks may be integrated with one another and chipped. In addition, an approach for circuit integration may be realized by a private circuit and/or a general-purpose processor, not limited to the LSI. In addition, in certain embodiments, where appearance of a technique for realizing an integrated circuit which would take the place of the LSI owing to progress of the semiconductor technology, it will be also possible to use the integrated circuit which will be realized by the above-mentioned technique.

Although the above-mentioned embodiment and modified example are described in detail as one aspect of the present invention with reference to the drawings as above, the specific configurations are not limited to the configurations of the above-mentioned embodiment and modified example and design changes and so forth which are made within a range not deviating from the gist of the present invention are also included. In addition, it is possible to change one aspect of the present invention in a variety of ways within the range which is defined in the claims and an embodiment which is obtained by appropriately combining together technical elements which are disclosed in mutually different embodiments respectively is also included in the technical range of the present invention. In addition, a configuration which is obtained by mutually replacing elements which are described in the above-mentioned embodiment and modified example and exhibit the same effect is also included.

As will be appreciated by one skilled in the art, aspects of the embodiments may be embodied as a system, apparatus or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "unit" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as units, in order to more particularly emphasize their implementation independence. For example, a unit may be implemented as a hardware circuit comprising custom VLSI circuits or gate arrays, off-the-shelf semiconductors such as logic chips, transistors, or other discrete components. A unit may also be implemented in programmable hardware devices such as field programmable gate arrays, programmable array logic, programmable logic devices or the like.

Units may also be implemented in code and/or software for execution by various types of processors. An identified unit of code may, for instance, comprise one or more physical or logical blocks of executable code which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit.

Indeed, a unit of code may be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different computer readable storage devices. Where a units or portions of a unit are implemented in software, the software portions are stored on one or more computer readable storage devices.

For example, one aspect of the present invention may be realized by combining together some or all elements of the above-mentioned embodiment and modified example. In various embodiments, the structures, units, functions, and other features are practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processing unit of the information processing device configured to output a first video signal;
an input unit of an information processing device configured to input a second video signal from an external device comprising a graphics processing unit ("GPU") and an input/output interface;
a switching unit configured to determine a route for a video display signal that is output to a display unit, the route selected from an external route along which the second video signal is output to the display unit without going through the processing unit and an internal route along which the first video signal is output to the display unit; and
an output unit configured to output video data which is output from the processing unit to the external device, the output unit being an independent interface from the input unit, wherein
the input unit inputs the second video signal which is obtained by performing predetermined processing on the video data by the external device, and
wherein at least a portion of each of said units comprises a set of hardware circuits; executable code stored on a set of non-transitory computer-readable storage media; or a combination of hardware circuits and executable code stored on a set of non-transitory computer-readable storage media.

2. The apparatus of claim 1, wherein the display unit comprises an external display panel.

3. The apparatus of claim 1, wherein the input unit inputs the video signal which is obtained by:
   communicating performance information of the display unit to the external device; and
   performing the predetermined processing on the video data based on the performance information of the display unit by the external device as the first video signal.

4. The apparatus of claim 1, wherein the switching unit includes:
   a first switch to which the second video signal which is input through the input unit is supplied;
   a second switch to which the second video signal which is output from the first switch and the first video signal which is output from the processing unit is supplied; and
   a switching control section which controls the second switch,
      wherein in response to the second video signal being supplied from the first switch to the second switch by the switching control section, the second switch outputs the second video signal to the display unit and
   wherein in response to the second video signal not being supplied from the first switch to the second switch by the switching control section, the second switch outputs the first video signal to the display unit.

5. The apparatus of claim 4, further comprising a third switch that supplies the second video signal to the switching unit, wherein the third switch comprises a passive crossbar switch and the first switch and second switch of switching unit comprise passive switches.

6. The apparatus of claim 1, further comprising a controller configured to set a video input/output interface of the information processing device comprising the input unit to operate in a video sink mode to receive the second video signal from an output unit of the external device, the output unit comprising a video input/output interface configured to operate in a video source mode.

7. The apparatus of claim 1, wherein
   the processing unit is a Central Processing Unit ("CPU") having a video data processing function.

8. The apparatus of claim 1, wherein the input unit is an interface which conforms to a Universal Serial Bus ("USB") Type-C standard.

9. The apparatus of claim 1, wherein the display unit is a built-in display unit of the information processing device.

10. A computer program product comprising a processor of an information processing device; and a tangible memory comprising code executable by the processor, the code configured to cause the processor to:
   output a first video signal from the processor to a switch;
   output video data from the processing unit to the external device, via an output unit of the information processing device comprising an independent interface from an input unit of the information processing device;
   cause input unit of the information processing device to input a second video signal from an external device and obtained by performing predetermined processing on the video data by the external device;
   set the switch to determine a route for a video display signal that is output to a display unit, the route selected from an external route along which the second video signal is output to the display unit without going through video processing by a processing unit of the information processing device and an internal route along which the first video signal processed by the processing unit is output to the display unit.

11. The computer program product of claim 10, wherein the display unit comprises an external display panel.

12. The computer program product of claim 10, wherein the code is further configured to cause the processor to:
   communicate performance information of the display unit to the external device; and
   input the video signal which is obtained by performing the predetermined processing on the video data based on the performance information of the display unit by the external device as the first video signal.

13. The computer program product of claim 10, wherein code is further configured to:
   control a switching unit that includes a first switch to which the second video signal which is input through the input unit is supplied and to further control a second switch to which the second video signal output from the first switch and the first video signal output from the processing unit are supplied;
   cause the second switch to output the second video signal to the display unit in response to the second video signal being supplied from the first switch; and
   cause the second switch to output the second video signal to the display unit in response to the second video signal not being supplied from the first switch.

14. The computer program product of claim 13, wherein the code is further configured to control a third switch that supplies the second video signal to the switching unit, wherein the third switch comprises a passive crossbar switch and the first switch and second switch of switching unit comprise passive switches.

15. The computer program product of claim 10, wherein the code is further configured to set a video input/output interface of the information processing device comprising the input unit to operate in a video sink mode to receive the second video signal from an output unit of the external device, the output unit comprising a video input/output interface configured to operate in a video source mode.

16. The computer program product of claim 10, wherein the processing unit is a Central Processing Unit ("CPU") having a video data processing function.

17. The computer program product of claim 10, wherein the code is further configured to send video data that is configured to be communicated over an interface which conforms to a Universal Serial Bus ("USB") Type-C standard.

18. The computer program product of claim 10, wherein the display unit is a built-in display unit of the information processing device.

19. A system comprising:
   an external device which at least includes a GPU (Graphics Processing Unit) and an input/output interface; and
   a video display device which at least includes a display unit,
   an input unit configured to input a second video signal from the external device,
   a processing unit configured to output a first video signal,
   an output unit configured to output video data which is output from the processing unit to the external device,
   and a switching unit configured to determine a route for a video display signal that is output to a display unit, the route selected from an external route along which the second video signal is output to the display unit without going through the processing unit and an internal route along which the first video signal is output to the display unit, wherein the output unit is configured to output video data which is output from the processing unit to the external device, the output unit being an independent interface from the input unit, and wherein the input unit inputs the second video signal which is obtained by performing predetermined processing on the video data by the external device, and wherein at least a portion of each of said units comprises a set of hardware circuits; executable code stored on a set of non-transitory computer-readable storage media; or a combination of hardware circuits and executable code stored on a set of non-transitory computer-readable storage media.

20. The system of claim 19, wherein the input/output interface in the external device and the input unit and the output unit in the video display device are interfaces which conform to a Universal Serial Bus ("USB") Type-C standard.

\* \* \* \* \*